US008004988B2

(12) United States Patent
Simmons et al.

(10) Patent No.: US 8,004,988 B2
(45) Date of Patent: Aug. 23, 2011

(54) ETHERNET CONTROLLER

(75) Inventors: Michael Simmons, Chandler, AZ (US);
Howard Henry Schlunder, Mesa, AZ
(US)

(73) Assignee: Microchip Technology Incorporated,
Chandler, AZ (US)

( * ) Notice: Subject to any disclaimer, the term of this patent is extended or adjusted under 35 U.S.C. 154(b) by 275 days.

(21) Appl. No.: 11/944,099

(22) Filed: Nov. 21, 2007

(65) Prior Publication Data
US 2009/0129269 A1    May 21, 2009

(51) Int. Cl.
*H04L 12/26* (2006.01)
(52) U.S. Cl. ...................................... 370/235
(58) Field of Classification Search .......... 370/229–236, 370/400, 412, 431, 462–465; 709/230–235
See application file for complete search history.

(56) References Cited

U.S. PATENT DOCUMENTS

| | | | | |
|---|---|---|---|---|
| 5,390,299 A * | 2/1995 | Rege et al. | ..................... | 709/234 |
| 5,434,872 A * | 7/1995 | Petersen et al. | ............... | 714/811 |
| 6,192,463 B1 * | 2/2001 | Mitra et al. | ..................... | 712/43 |
| 7,065,582 B1 * | 6/2006 | Dwork et al. | ................. | 709/234 |
| 7,355,969 B2 * | 4/2008 | Champlin et al. | ............ | 370/230 |
| 2004/0160972 A1 * | 8/2004 | Tang et al. | ..................... | 370/412 |
| 2005/0013319 A1 * | 1/2005 | Kenkare | ..................... | 370/463 |
| 2005/0268137 A1 * | 12/2005 | Pettey | ............................ | 713/400 |
| 2009/0157919 A1 * | 6/2009 | Dodson et al. | ................. | 710/57 |

FOREIGN PATENT DOCUMENTS

| GB | 2360666 | 9/2001 |
|---|---|---|
| WO | 0058828 | 10/2000 |

OTHER PUBLICATIONS

International Search Report and Written Opinion for Application No. PCT/US2008/084375 (12 pages), Mar. 26, 2009.
International Preliminary Report on Patentability for Application No. PCT/US2008/084375 (7 pages), Jun. 3, 2010.
International Search Report and Written Opinion for Application No. PCT/US2008/084371 (13 pages), Mar. 5, 2009.

* cited by examiner

*Primary Examiner* — Dmitry H Levitan
(74) *Attorney, Agent, or Firm* — King & Spalding L.L.P.

(57) ABSTRACT

An Ethernet controller has a buffer memory for receiving data packets, a data flow control unit for controlling the data flow to Ethernet controller, a packet counter, packet counter control logic for incrementing and decrementing the packet counter, a first register for storing a watermark, and a comparator logic coupled to the packet counter and the register for sending control signals to the data flow control unit.

19 Claims, 4 Drawing Sheets

ETHERNET CONTROLLER

TECHNICAL FIELD

The technical field of the present application relates to Ethernet controllers.

BACKGROUND

Ethernet controllers, in particular stand alone Ethernet Controllers, are designed to serve as an Ethernet network interface for any type of microprocessor or microcontroller. Such a controller can have a fairly large memory and may include a dedicated interface such as a serial peripheral interface (SPI) bus. In some embodiments, such an Ethernet controller may also be integrated in a microcontroller using the SPI bus or any other capable interface connection. The Ethernet controller handles all communication protocols and comprises a large buffer for intermediate storage of incoming and outgoing messages. A microcontroller or microprocessor may then communicate and control the Ethernet controller via the interface. The stand alone or an integrated Ethernet controller handles coordination of incoming and outgoing data packets as well as packet filtering. It may further comprise an internal direct memory access (DMA) module for fast data throughput and hardware assisted checksum calculation. The communication of an Ethernet controller with a microcontroller or microprocessor can be established interrupt or polling driven.

However, conventional stand alone Ethernet controllers may not have any automatic flow control mechanism. Hence, data packets are written to the buffer as they are received. If a buffer is full, the received packets need to be dropped and will get lost. The external microcontroller or processor has to prevent any overflow of the buffer in case the controller cannot retrieve received data packets as fast as they are written to the buffer. To this end, relatively complex software is necessary to control the data flow within the Ethernet controller by an external processor.

SUMMARY

According to an embodiment, an Ethernet controller may comprise a buffer memory for receiving data packets, a data flow control unit for controlling the data flow to the Ethernet controller, a packet counter, packet counter control logic for incrementing and decrementing the packet counter, a first register for storing a watermark, and a comparator logic coupled to the packet counter and the register for sending control signals to the data flow control unit.

According to another embodiment, the comparator logic may comprise a first comparator coupled with the first register. According to another embodiment, the Ethernet controller may further comprise a second register, wherein the comparator logic comprises a second comparator coupled to the second register. According to another embodiment, the Ethernet controller may further comprise means for subtracting an offset value from the first register, wherein the comparator logic comprises a second comparator coupled to an output of the means for subtracting. According to another embodiment, the packet counter may receive increment signals generated by hardware and decrement signals generated by software. According to another embodiment, the Ethernet controller may further comprise a register programmable for activating an automatic data flow control controlled by the packet counter, first register and comparator logic or a manual data flow control. According to another embodiment, the data flow control unit can be controlled by setting at least one bit in a bitfield. According to another embodiment, the bitfield can be operable to be programmed by an external processor or by the comparator logic.

According to yet a further embodiment, an Ethernet controller may comprise a buffer memory for receiving data packets, a packet counter, packet counter control logic for incrementing and decrementing the packet counter, a first register for storing a first watermark, a second register for storing a second watermark, a first comparator coupled to the packet counter and the first register, a second comparator coupled to the packet counter and the second register, a data flow control unit coupled to the first and second comparator.

According to another embodiment, the packet counter may receive increment signals generated by hardware and decrement signals generated by software. According to another embodiment, the Ethernet controller may further comprise a register programmable for activating an automatic data flow control controlled by the packet counter, first and second register and first and second comparators or a manual data flow control. According to another embodiment, the data flow control unit can be controlled by setting at least one bit in a bitfield. According to another embodiment, the bitfield can be operable to be programmed by an external processor or by the comparator logic.

According to yet a further embodiment, a method for controlling the data flow in an Ethernet controller may comprise the steps of: incrementing a counter when a packet has been received and stored in a buffer; decrementing the counter when a packet has been retrieved from the buffer; and comparing the counter value with a first predefined value to generate a first flow control signal.

According to another embodiment, the method may further comprise the step of comparing the counter value with a second predefined value to generate a second flow control signal. According to another embodiment, the first flow control signal may prevent further packets to be transmitted to the Ethernet controller. According to another embodiment, the method may further comprise programming at least one bit in a register which indicates whether the flow control signals automatically control a data flow control in the Ethernet controller. According to another embodiment, the packet counter can be incremented by hardware and decremented by software. According to another embodiment, when the counter reaches or exceeds the first predefined value an interrupt may be generated. According to another embodiment, when the counter reaches or falls below the second predefined value an interrupt may be generated.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Figure 1:
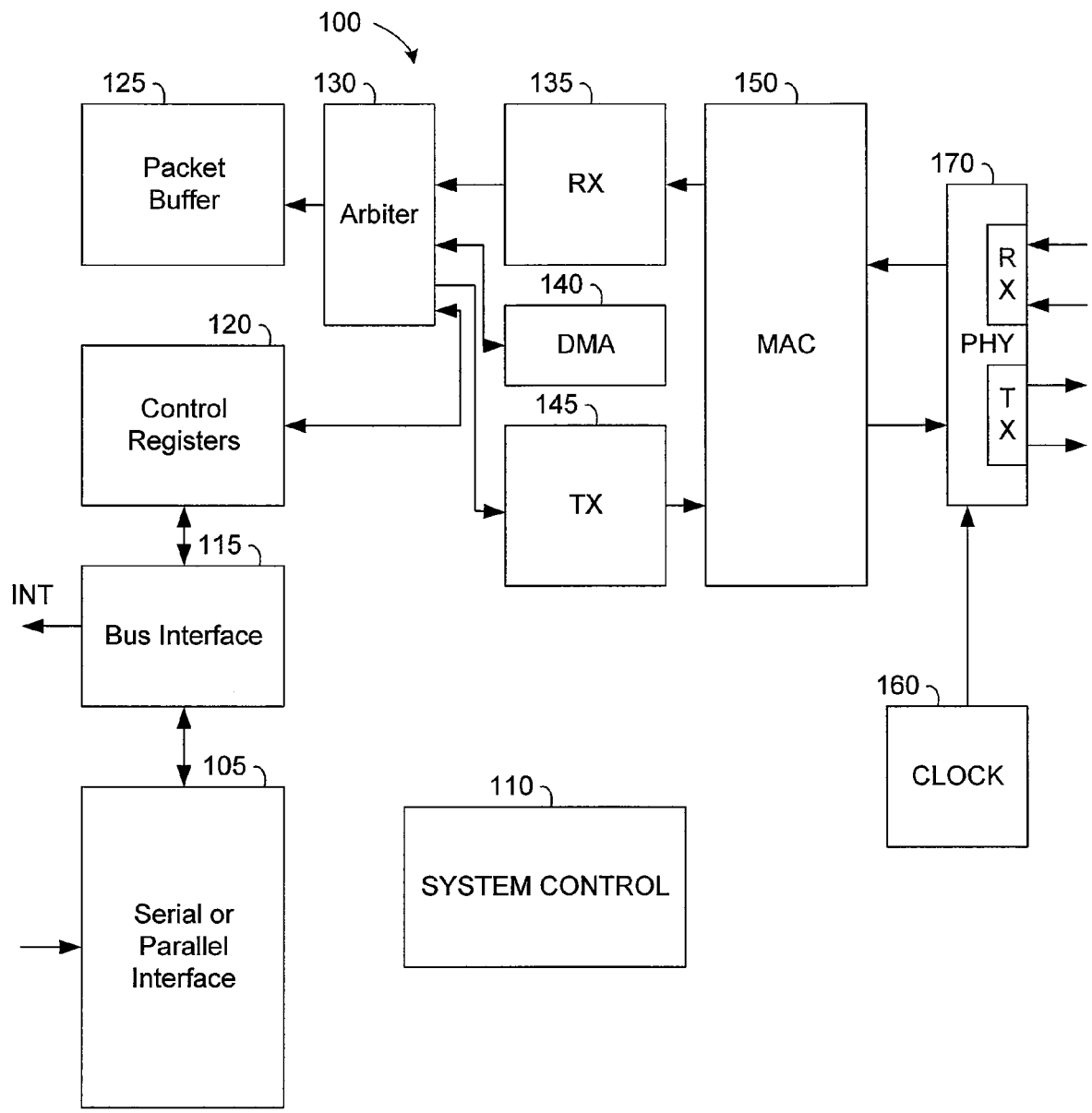
FIG. 1 is a block diagram of an Ethernet controller module as used in a stand alone Ethernet controller or an integrated module for a microcontroller.

FIG. 1 shows as an embodiment of a controller a block diagram of a Ethernet controller 100 that can be a stand alone Ethernet controller or an Ethernet controller module integrated, for example, in a microcontroller. The Ethernet controller 100 comprises a typical physical layer (PHY) 170 with transmit and receive units TX and RX for transmitting and receiving of the actual analog data over the network. This physical layer 170 is coupled with a media access control (MAC) data link layer 150 for implementing the actual Ethernet standard (IEEE 802.3). The Mac layer 150 is coupled with a receive unit 135 and a transmit unit 145 which may include respective filter units, flow control and host interfaces. The Ethernet controller may also include a direct memory access (DMA) controller 140 capable of performing, for example, a checksum evaluation. An arbiter 130 may be implemented to switch coupling between the actual buffer 125 and the modules 120, 135, 140, and 145. The control registers 120 are coupled with a bus interface 115 and a serial or parallel interface 105. The serial interface can be, for example, a SPI interface or any other suitable inter circuit interface. The bus interface 115 may provide for additional interrupt signals to provide for additional control of the Ethernet controller 100. The Ethernet controller 100 may be internally controlled by a system control unit 110 which controls the respective units of the Ethernet controller 100. System control unit 110 receives commands from the serial or parallel interface 105 and provides for decoding of these commands. The commands can provide for reading and writing of at least some or all registers and for executing functions of the respective controller. In particular, the system control 110 may provide for the respective control sequences to perform read and write access to the buffer 125 as will be explained in more detail below. Clock unit 160 provides for the required Ethernet transmission clock signal.

Figure 2:
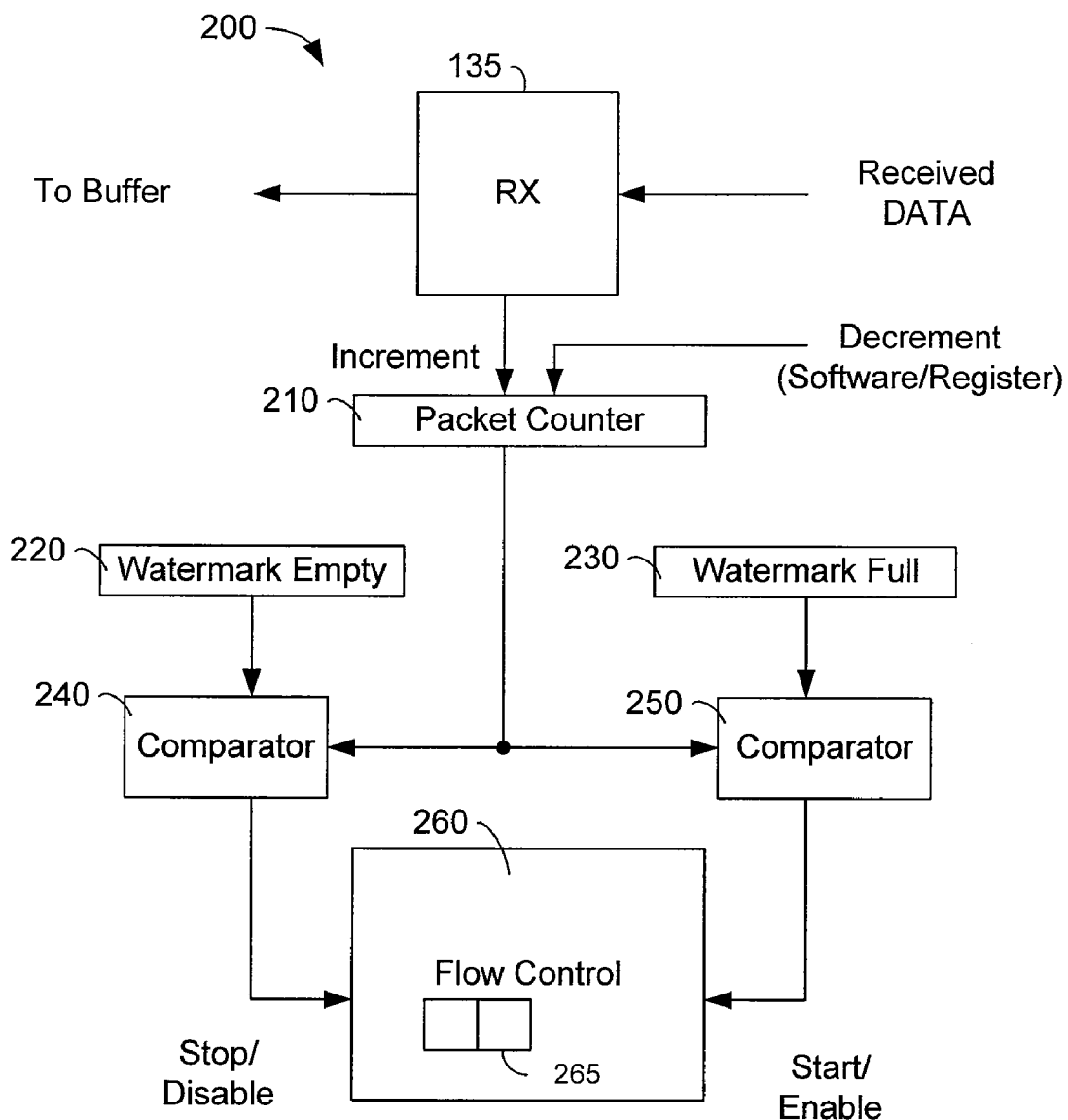
FIG. 2 illustrates an embodiment of a control logic within an Ethernet controller.

FIG. 2 shows certain details of control logic for the receive channel RX of an Ethernet controller. The higher layers of the Ethernet controller assemble the received data from the physical layer into so called packets. These packets are then transferred for temporary storage in the buffer 125 from where they can be retrieved via the interface 105 (See FIG. 1). According to an embodiment, a packet counter 210 is implemented which is incremented every time a packet has been stored in buffer 125. Once the external microcontroller or processor retrieves a packet from buffer 125 or processes a packet within the buffer 125, the packet counter is decremented. To this end, an automatic decrement signal can be generated once a respective command for reading a packet from buffer 125 has been executed by the system control 110. However, other embodiments may include a manual decrement function in which the external microcontroller or processor must set a flag in a special register after a packet has been retrieved. The microcontroller or processor can also read the content of the packet counter for manual flow control of Ethernet controller 100.

As stated above packet counter 210 counts the number of packets received in buffer 125. The counter can be for example an 8-bit counter in one embodiment. In this case, once a packet has been successfully received, this counter is incremented by hardware. Software decrements the counter 210 after a packet has been read out of the buffer. This register can be designed not to roll over when hardware tries to increment counter 210 and the counter has already reached its highest value, for example, 0xFF. Conversely, the counter does not roll under, for example, from 0x00 to 0xFF, when software tries to decrement the counter and the counter is already down to 0x00. When software attempts to decrement the counter 210 at the same time that the hardware attempts to increment the counter, counter 210 will remain unchanged. When counter 210 is incremented to 0xFF, a status bit in a special function register can be set and an interrupt may be generated depending on the setting of a respective interrupt control register. Also, when the packet counter 210 has a value of non-zero a packet pending bit can be set in a special function register which may cause the generation of another interrupt signal. The counter may be automatically reset to zero upon a general reset or a reset of the RX logic.

According to an embodiment, two programmable registers 220 and 230 are provided in the special function register block. The first register 220 is used as a watermark register for indicating a software defined watermark level of buffer 125 indicating that the buffer is empty or ready to receive additional data packets. A second register 230 is used as a watermark register for indicating another software defined watermark level of buffer 125 indicating that the buffer is nearly full or cannot receive any more additional data packets. Respective comparators 240 and 250 are coupled with these watermark registers 220 and 230. The comparators 240 and 250 also receive the content of packet counter 210 for comparison with the respective content of the watermark registers 220 and 230. Comparators 240 and 250 generate output signals that serve as control signals for the flow control functionality of Ethernet controller 100.

Figure 3:
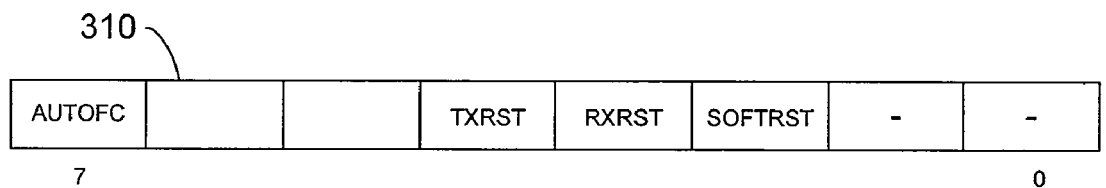
FIG. 3 shows a general control register for controlling functions of an Ethernet controller according to an embodiment.

FIG. 3 shows a general control register by means of which certain functions of an Ethernet controller can be controlled. A setting of bit SOFTRST resets the entire Ethernet subsystem including the Mac layer 150 and the physical layer 170. After a reset has been completed the bit is automatically cleared by the system control unit 110. Setting of this bit has, thus, the same effect as sending a reset command to the interface 105 by the external microcontroller or processor. Setting of the bit RXRST resets the RX logic and setting of the bit TXRST resets the respective TX logic. The highest bit AUTOFC in this control register enables the automatic flow control. Setting this bit will enable the system to automatically enable and disable the data flow to the controller using the watermark registers as will be explained in more detail below.

Once the AUTOFC bit has been set, automatic flow control is initiated. Prior to initiating automatic flow control a user might want to preset the watermark registers 220 and 230. For example, assuming buffer 125 can hold 20 packets, register 230 indicating the full watermark may be set to a predefined value, for example, 16-18 and register 220 which indicates the empty watermark may be set to another predefined value, for example, 2-6. Every time the Ethernet controller receives a packet from the external connection lines, packet counter 210 is incremented and every time an external microcontroller or processor reads a packet from the buffer 125 packet counter 210 is decremented. During automatic flow control operation, comparators 240 and 250 perpetually compare the content of packet counter 210 with the respective content of watermark registers 220 and 230. Once the content of a packet counter reaches one of the watermark values, the respective comparators generate a signal which is sent to flow control unit 260.

Thus, whenever the watermark of register 230 is reached, Ethernet controller 110 will send a message to the connected device to prevent transmission of any further packets. The watermark FULL can be selected to be close to the maximum available number of packets which are storable in buffer 125. The difference between maximum capacity in buffer 125 and the high value in watermark register 230 can be chosen to allow for completion of any transmission that is pending while Ethernet controller tries to stop further transmissions. Once data flow has been automatically stopped, the second watermark register 220 can be used to restart the data flow. To this end, comparator 240 signalizes flow control unit 260 whenever packet counter has been decremented to its watermark value. Then, flow control unit can send appropriate signals to allow for further transmissions. The watermark empty level may be set sufficiently high to allow for headroom until new transmission have been received. In the meantime, an external controller can still load any packets from this headroom in buffer 125.

According to an embodiment, flow control unit 260 may have different operating modes controlled by comparators 240 and 250. Once a "Start" signal has been received by comparator 230, flow control can be enabled. Ethernet controller 100 will then send a PAUSE frame and resend a PAUSE frame every x clock cycles, wherein x is a predefined number. The clock signal used may depend on the transmission rate. For example, for 10 Mbps operation, the clock runs at 2.5 MHz and for 100 Mbps operation, the clock runs at 25 MHz. For other transmission operations other clock signals may apply. The flow control may be disabled by the Stop signal generated by comparator 240. Once this Stop signal is sent to flow control unit, Ethernet controller 100 may send a PAUSE frame with a 0x0000 Pause timer value. Thus, no more data packets will be sent to Ethernet controller 100 unit flow control has been enabled. Enabling and disabling of flow control can be performed by means of setting of respective bits in a flow control register. Thus, if the AUTOFC bit has not been set, manual control is also possible by setting and resetting of the respective bits in such a control register by the external microcontroller or processor. For example a two bit bitfield 265 or register may be used in one embodiment to provide for this functionality. When automatic flow control is enabled, it may have the highest priority for setting and clearing the bitfield 265 over any other source. According to various embodiments, other priority schemes are possible.

As shown in FIG. 2, the comparators 240 and 250 may also generate respective interrupt signals INT_Empty and INT_Full whenever the watermark registers coincide with the packet counter value. Such interrupt generation and handling may be controlled by respective bits in an interrupt control register which can be part of a set of special function registers.

Figure 5:
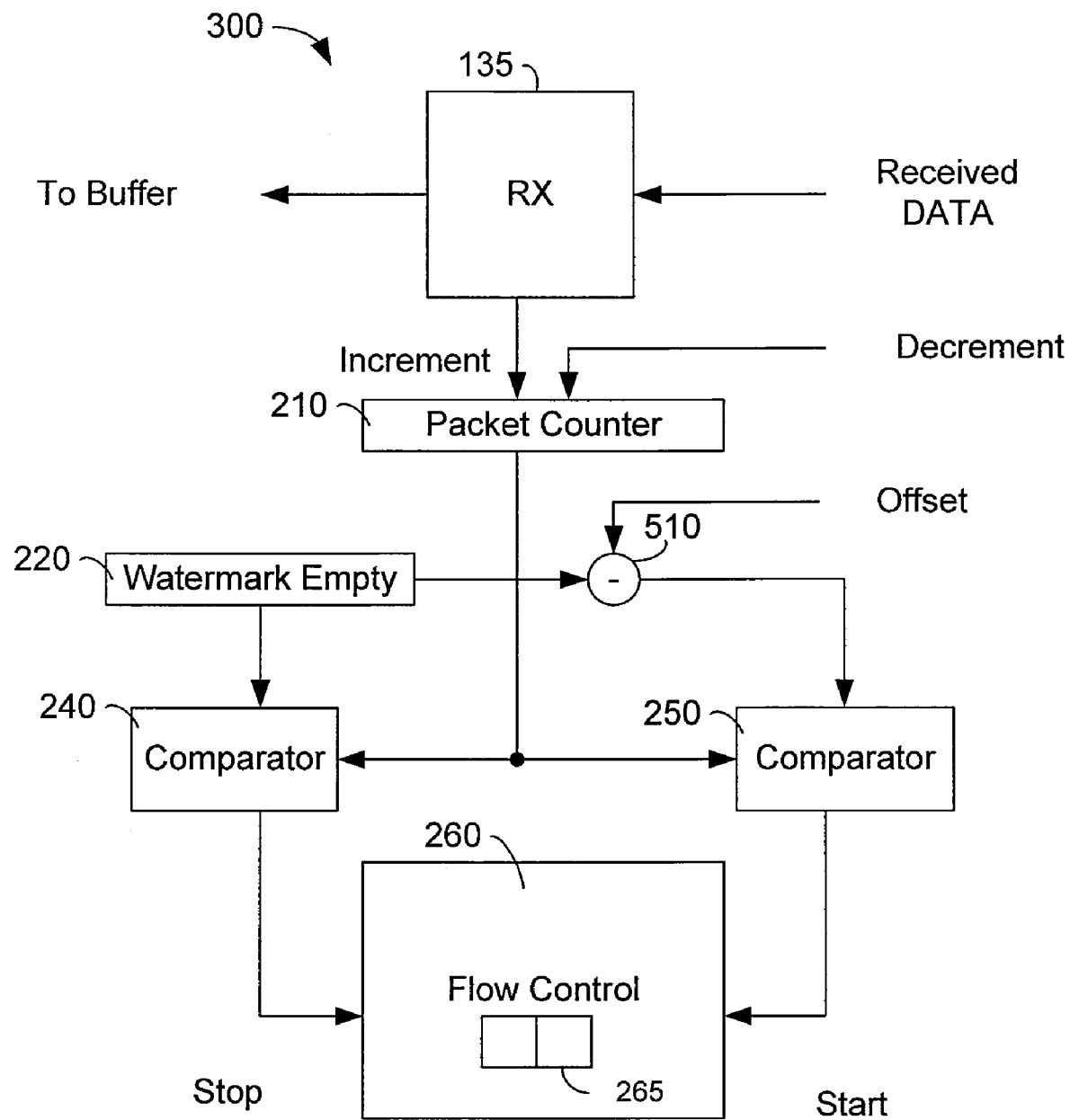
FIG. 5 illustrates another embodiment of a control logic within an Ethernet controller.

The provision of two watermark registers allows for a flexible programming of a hysteresis in the flow control. However, according to another embodiment, as shown in FIG. 5, only a single watermark register 220 may be used. Instead of a second register an offset value is subtracted from the content of register 220 by subtractor 510 and fed to comparator 250. Alternatively a negative offset value may be added by an adder and fed to comparator 250. This embodiment, has a fixed hysteresis between the empty and full mark which may be sufficient for most applications.

Figure 4:
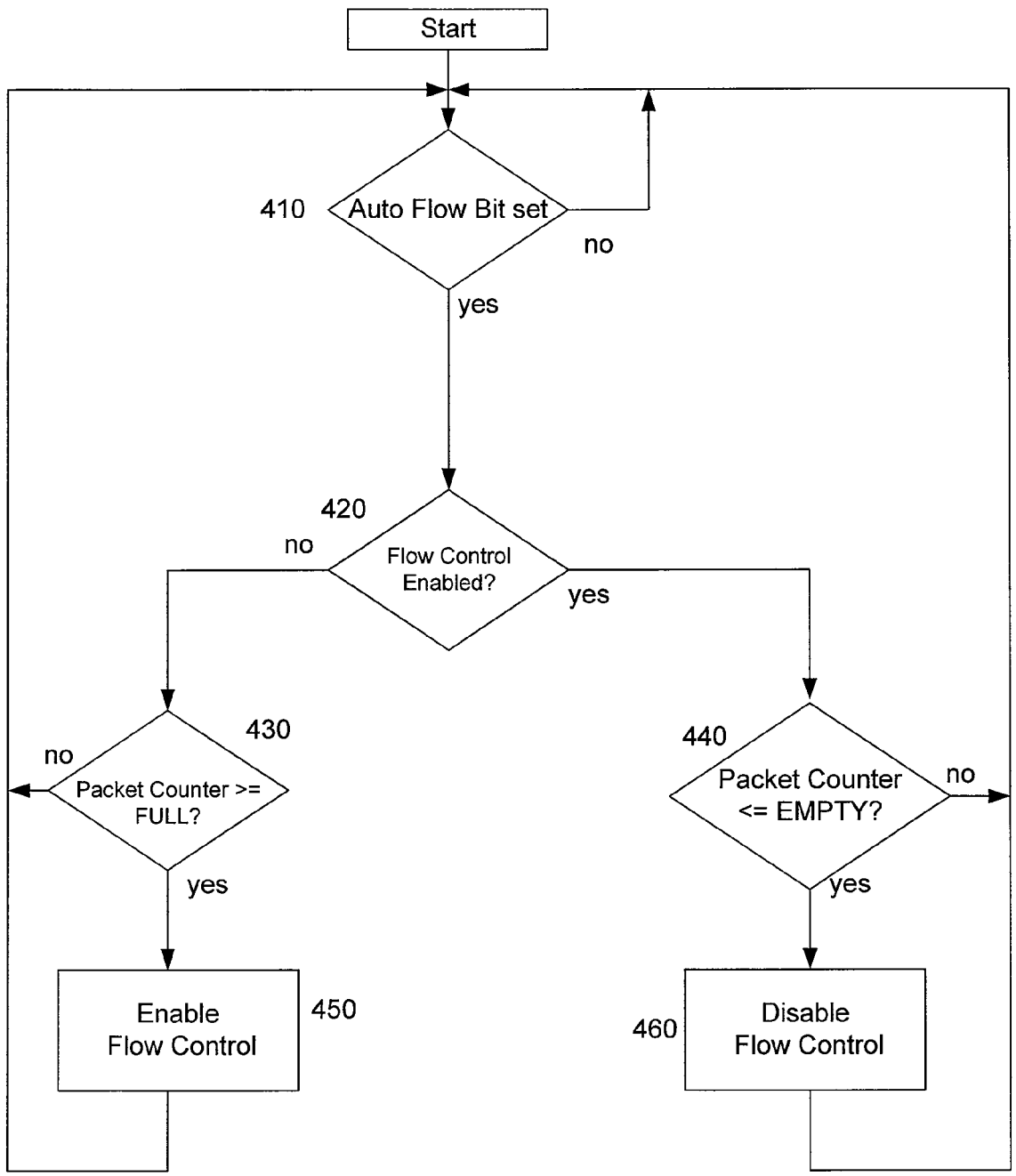
FIG. 4 shows a flow chart of an automatic flow control according to an embodiment.

FIG. 4 shows the general flow chart how a state machine may handle the automatic flow control in an Ethernet controller. In step 410 the machine checks whether the auto flow bit has been set. If not, the machine proceeds to step 420, where it is checked whether flow control is enabled or not. If flow control is not enabled, the packet counter value is compared with the first watermark register in step 430. This comparison can be made for "equal" comparison or "equal or greater" comparison. If this comparison results in a yes the flow control is set in step 450 to prevent any further transmission of packets. The routine then returns to the beginning. If the result is no then the routine directly returns to the beginning. If in step 420 it has been determined that flow control is enabled, the routine continues with step 440 in which a comparison of the packet counter and the second watermark register is performed. Again, this comparison can be made as an "equal" comparison or "equal or lower" comparison. If the result is yes then the flow control is disabled in step 460. The routine then returns to the beginning. If the result in step 440 is no, then the routine returns directly to the beginning. Other control sequences are possible according to different software implementations.

What is claimed is:

1. A stand alone Ethernet controller comprising:
an interface for coupling the stand alone Ethernet controller with an external processor;
a system control unit coupled with said interface, wherein the system control unit receives and decodes commands received from the external processor through said interface;
an Ethernet input and output port;
a buffer memory for storing data packets received by the Ethernet input port from an external device, wherein the system control unit performs read and write accesses to the buffer memory;
a data flow control unit coupled with the Ethernet output port for controlling the data flow to the Ethernet controller;
a packet counter;
packet counter control logic for incrementing and decrementing the packet counter, wherein said packet counter is incremented when a data packet has been written into the buffer memory and decremented when said system control unit processed a packet read command received through said interface from the external processor;
a first register for storing a first watermark;
a comparator logic coupled to the packet counter and the first register for sending control signals to the data flow control unit, wherein when a packet counter value is greater or equal to said first watermark, an Ethernet transmission signal is sent to the external device which prevents the external device from further transmissions to the stand-alone Ethernet controller.

2. The Ethernet controller according to claim 1, wherein the comparator logic comprises a first comparator coupled with the first register.

3. The Ethernet controller according to claim 2, further comprising a second register for storing a second watermark being lower than said first watermark, wherein the comparator logic comprises a second comparator coupled to the second register and wherein when a packet counter value is less or equal than said second watermark, a, further Ethernet transmission signal is sent to the external device which allows the external device to send further transmissions to the Ethernet controller.

4. The Ethernet controller according to claim 2, further comprising means for subtracting an offset value from the first register to provide a second watermark, wherein the comparator logic comprises a second comparator coupled to an output of the means for subtracting, and wherein when a packet counter value is less or equal than said second watermark, a further Ethernet transmission signal is sent to the external device which allows the external device to send further transmissions to the stand alone Ethernet controller.

5. The Ethernet controller according to claim 1, wherein the packet counter is decremented by setting a flag in a special function register by means of the external processor.

6. The Ethernet controller according to claim 1, further comprising a control register programmable by means of the external processor for activating an automatic data flow control controlled by the packet counter, first register and comparator logic.

7. The Ethernet controller according to claim 1, wherein the data flow control unit is controlled by setting at least one bit in a control register.

8. The Ethernet controller according to claim 7, wherein the control register is operable to be programmed by the external processor or by the comparator logic.

9. A stand alone Ethernet controller comprising:
an interface for coupling the stand alone Ethernet controller with an external processor;
a system control unit coupled with said interface, wherein the system control unit receives and decodes commands received from the external processor through said interface;
an Ethernet input and output port;
a buffer memory for storing data packets received by the Ethernet input port from an external device, wherein the system control unit performs read and write accesses to the buffer memory;
a packet counter;
packet counter control logic for incrementing and decrementing the packet counter, wherein said packet counter is incremented a data packet has been written into the buffer memory and decremented when said system control unit processed a packet read command received through said interlace from the external processor;
a first register for storing a first watermark;
a second register for storing a second watermark;
a first comparator coupled to the packet counter and the first register;
a second comparator coupled to the packet counter and the second register;
an Ethernet data flow control unit coupled with the Ethernet output port, wherein when a packet counter value is greater or equal to said first watermark, an Ethernet transmission signal is sent to the external device which prevents the external device from further transmissions to the stand alone Ethernet controller.

10. The Ethernet controller according to claim 9, wherein the packet counter is decremented by setting a flag in a special function register by means of the external processor.

11. The Ethernet controller according to claim 9, further comprising a register programmable by means of the external processor for activating an automatic data flow control controlled by the packet counter, first and second register and first and second comparators.

12. The Ethernet controller according to claim 9, wherein the Ethernet data flow control unit is controlled by setting at least one bit in a control register.

13. The Ethernet controller according to claim 12, wherein the control register is operable to be programmed by the external processor or by the comparator logic.

14. A method for controlling the data flow in a stand alone Ethernet controller, wherein the stand alone Ethernet controller comprises a control unit, a buffer and a counter, comprising the steps of:
coupling the stand alone Ethernet controller with an external processor;
incrementing the counter by said stand alone Ethernet controller when a packet sent by an external device has been received through an input port of the stand alone Ethernet controller and stored in the buffer;
decrementing the counter by said stand alone Ethernet controller when a packet has been retrieved from the buffer by the external processor; and
comparing the counter value with a first predefined value to generate a first Ethernet flow control command and
sending the first Ethernet flow control command through an external Ethernet output port of said stand alone Ethernet controller to prevent the external device from further transmissions to the stand alone Ethernet controller.

15. The method according to claim 14, further comprising the step of
comparing the counter value with a second predefined value to generate a second Ethernet flow control command to restart transmissions from said external device, and
sending the second Ethernet flow control command through the external Ethernet output port.

16. The method according to claim 15, further comprising programming at least one bit in a register by the external processor which indicates whether the Ethernet flow control commands automatically control a data flow control in the Ethernet controller.

17. The method according to claim 15, wherein when the counter reaches or falls below the second predefined value an interrupt is generated and fed to said external processor.

18. The method according to claim 14, wherein the packet counter is decremented by setting a flag in a special function register by means of the external processor.

19. The method according to claim 14, wherein when the counter reaches or exceeds the first predefined value an interrupt is generated and fed to said external processor.

* * * * *